Oct. 1, 1957 P. G. STEPHAN 2,807,998
SEPARATION APPARATUS
Filed Feb. 24, 1955

INVENTOR
PAUL G. STEPHAN
BY
ATTORNEY 2,807,998

SEPARATION APPARATUS

Paul Glenn Stephan, Old Hickory, Tenn., assignor to E. I. du Pont de Nemours and Company, Wilmington, Del., a corporation of Delaware Application February 24, 1955, Serial No. 490,287

3 Claims. (Cl. 100—121)

This invention relates to apparatus for separating the solid and liquid components of a slurry. More particularly, it relates to an improved apparatus for the continuous separation of the solid components from the liquid of the slurry.

An apparatus for separating solid materials from a suspension is disclosed in U. S. Patent 2,308,031, which issued January 12, 1943, to William R. Schmitz, Jr. The apparatus consists of, in general terms, a slurry receiving chamber with a pair of parallel cylindrical press rolls rotatably mounted in one wall of the chamber, openings in the rolls to act as a filtering surface to permit liquid to pass into the interior of the rolls while the solid material passes between the bite of the rolls and sealing means to seal the adjacent surfaces of the rolls and the chamber to enable a pressure differential to be maintained across the filtering surface.

One of the difficulties encountered in the apparatus is that solid particles tend to settle in the slurry receiving chamber, gradually closing off an area of the press rolls. To compensate for the reduction in filtering area the pressure of the slurry supply increases. The increase in pressure tends to intensify the problem by further compacting the settled portion of the slurry and further plugging the press rolls. When the filtering area becomes small enough and the pressure required becomes excessive, the unit must be shut down and cleaned before resuming operation. When preparing alkali cellulose slabs in accordance with the process disclosed by William R. Schmitz, Jr., in U. S. Patent 2,392,269 and using the apparatus disclosed in U. S. Patent 2,308,031, it has been found necessary to shut the apparatus and clean it about every ten days. Such frequent shut-downs make the process inefficient, tedious and uneconomical.

It is an object of the present invention to provide an improvement in the apparatus for separating solid materials from liquid media in slurries. It is a further object to provide a separating apparatus that can operate continuously without any appreciable buildup in pressure. Other objects will appear hereinafter.

The objects are accomplished, in brief, by an apparatus which includes, in combination, the basic elements shown in U. S. Patent 2,308,031 and a plurality of specially designed agitators in the bottom of the slurry receiving chamber.

Figure 1:
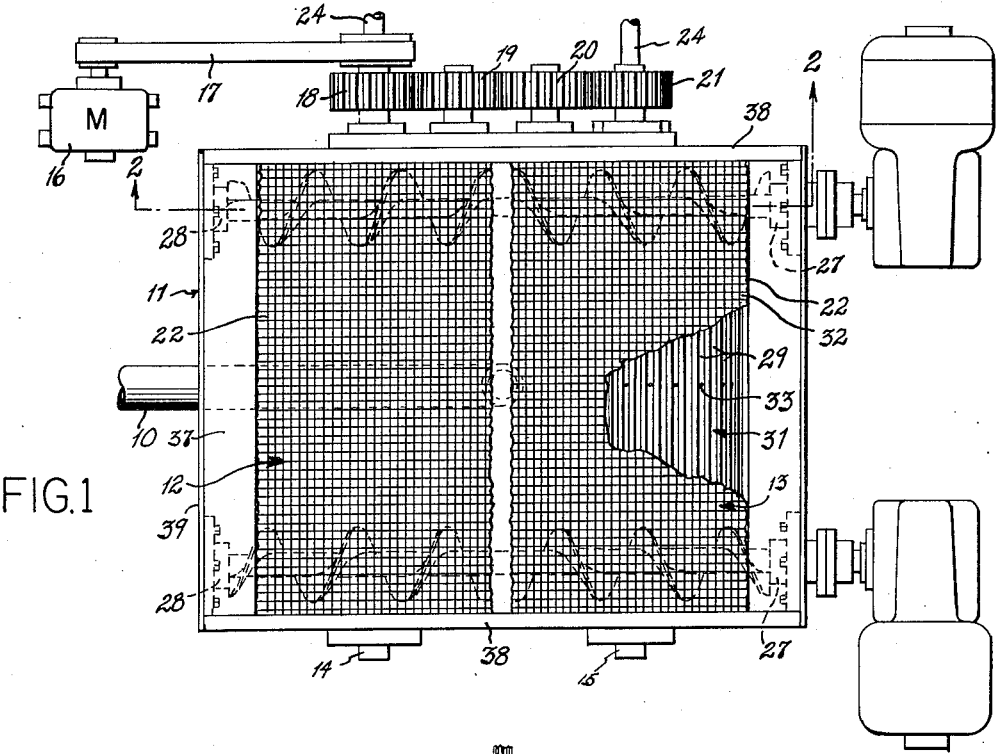
Figure 1 is a plan view of a preferred embodiment of the apparatus of the present invention.
Figure 2:
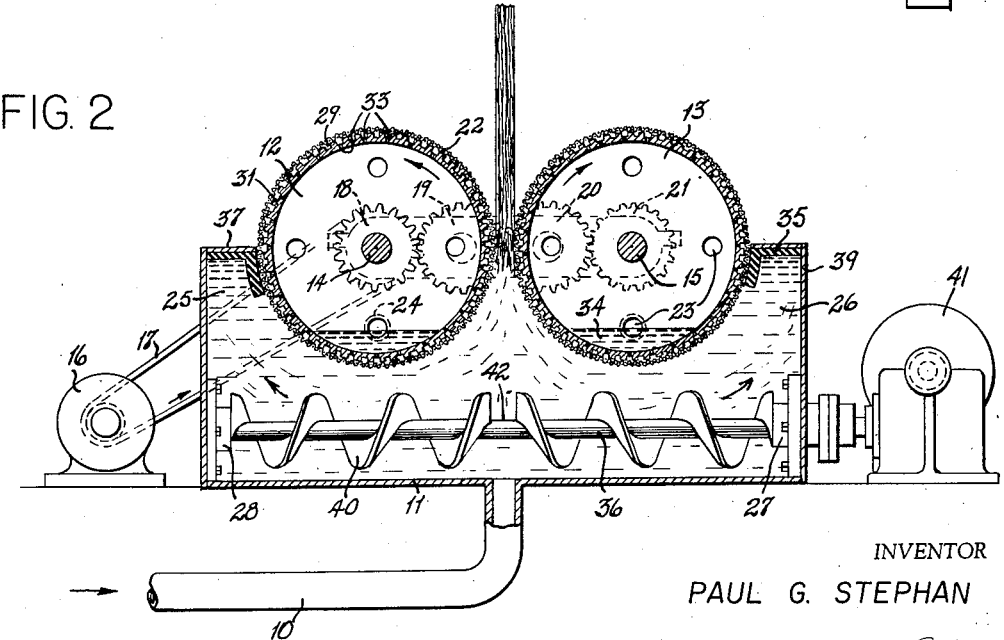
Figure 2 is a sectional view through the apparatus on line 2—2 of Figure 1.

Referring to the drawings, the slurry is forced through conduit 10 into the slurry receiving chamber 11. A pair of press rolls 12 and 13 are positioned in the top wall 37 of the chamber 11. The rolls are mounted on shafts 14 and 15, and the shafts are journaled in the top wall for rotation. The rolls may be driven in any desired manner in opposite directions as shown in Figure 2 so that their surfaces at the bite between them move in an upward direction. An arrangement of a motor 16, pulley belt 17 and gears 18, 19, 20 and 21 to drive the rolls is shown in the figures. Each of the rolls 12 and 13 comprises a cylindrical member 31 containing a plurality of longitudinal grooves 29. The outer periphery of the rolls comprises a perforated member 22 containing a large number of small perforations 32 for the passage of liquid from the slurry. The perforations 32 must be sufficiently small to prevent any substantial passage of solid material. The cylindrical members 31 are provided with openings 33 to permit the liquid which passes through the perforations 32 and along the grooves 29 to pass into the interiors of the cylindrical members 31. The interiors are maintained at atmospheric pressure. The liquid 34 in the interior of the cylindrical rolls 12 and 13 is passed from the rolls through openings 23 and conduits 24. The conduits 24 are positioned in the chamber 11 and are in radial alignment with the openings 23. Upon rotation of the rolls the openings 23 will periodically align themselves with the conduit 24. The rolls 12 and 13 are positioned closely adjacent to the side walls 38 of the chamber 11 to prevent any substantial leakage of slurry between the rolls and the chamber. The close clearance between the end surfaces of the rolls and the side walls of the chamber also provides an effective seal between the chamber and the roll surfaces. The sections of the chamber adjacent to the peripheral surfaces of the two rolls are provided with flexible sealing means 35 composed of rubber or the like. The sealing means 35 is adapted to yield upon rotation of the rolls, while being forced against the peripheral surface of the rolls by the pressure of the slurry in the chamber to maintain the seal.

During operation of the apparatus there is a tendency for dense slurry to settle in various areas of the chamber 11. The areas 25 and 26 located between the peripheries of the rolls and the end walls 39 of the chamber, as indicated in Figure 2, tend to accumulate large amounts of the dense slurry. The effective filtering area of the rolls is, therefore, substantially reduced. By means of two "split-screw" agitators, buildup of material in any area of the chamber is prevented. Each agitator comprises a horizontal shaft 36, journaled to rotate in bearings 27 and 28 provided at each end of the chamber 11 in the end walls 39 thereof and driven by a motor 41. The shafts are located below the press rolls 12 and 13 and arranged so that their axes are in a direction at right angles to the direction of the axes of the press rolls. Each end of the shafts is provided with a helical vane or spiral blade 40. Helical vane and spiral blade are alternative terms used in this specification to denote the structure 40. The two vanes or blades on each shaft have opposite pitch and terminate near the center of the shaft. For each shaft, a distance approximately equal to the inside diameter of the inlet conduit 10 is free of blade or vane windings thereon. The direction of rotation of the shafts forces material to flow from the center outwardly and upwardly.

The apparatus, when used to filter the alkali cellulose slurries of the cellophane industry, has provided continuous operation without shut-downs for cleaning for 6 months or longer.

In the preferred embodiment, two agitators are used. However, more agitators, each comprising a shaft with two helical vanes or spiral blades of the design specified, may be used. The direction of rotation of the agitator shaft as specified above (to force slurry outwardly and upwardly) is preferred. Rotation in the opposite direction (to force slurry inwardly and upwardly) may also be used with good results. For optimum results, it is also desirable to locate the agitators as close to the bottom of the chamber as feasible.

Other types of agitators, such as the propeller-type or knife-blade type or the screw-type with the spiral blade in one direction were found not to be adequate in the present apparatus. The "split-screw" type with helical vanes spiralled in opposite directions, as shown, provides excellent results with dense slurries in the present apparatus. The space left between the two spirals near the center of the shaft provides the optimum agitation in combination with the other elements of the apparatus of the invention. Surprisingly, the simple expedient of leaving a portion of the shaft as at 42 without blade windings eliminates substantially all tendency of the dense material to pack and clog the filtering surface of the rolls.

The particular filtering surface described and the particular means of sealing the chamber, although preferred, are not critical to the operation of the apparatus. The operation depends on three elements: (1) a pair of rolls serving as filter and press rolls, (2) means for sealing the surfaces between the rolls and the chamber and (3) a plurality of "split-screw" agitators as described.

The apparatus is economical from the standpoint of construction, maintenance and operation. It is particularly suited to the handling of dense slurries, such as alkali cellulose slurries used in preparing viscose solutions for cellophane and rayon manufacture.

Having described the invention, I claim:

1. In an apparatus for separating the solid component from the liquid component of a slurry wherein the slurry is forced under pressure into a slurry receiving chamber through a conduit having an inlet in the bottom of the chamber and then between the bite of two rotatable perforated press rolls in the top wall of the chamber, the liquid passing through the perforations into the interior of the rolls and the solid passing through the bite of the rotatable press rolls to form a sheet, the improvement which comprises a plurality of rotatable parallel shafts mounted in the chamber, each shaft disposed below and extending in a direction which lies in a plane perpendicular to the axes of the rolls, said shafts provided at each end with helical windings, said windings on each shaft being of opposite pitch and terminating near the center of the shaft leaving a portion of the shaft free of windings to substantially eliminate clogging the perforations of the press rolls with the solid component of the slurry.

2. The improvement of claim 1 wherein the portion free of windings between the two sets of helical windings on the shaft is approximately equal in length to the diameter of the inlet conduit.

3. The improvement of claim 1 including means for rotating said shafts in a direction to advance the leads of said windings toward the respective ends of said shafts, to move the slurry outwardly and upwardly with respect to the conduit inlet.

References Cited in the file of this patent

UNITED STATES PATENTS

| | | |
|---|---|---|
| 451,304 | Jones | Apr. 28, 1891 |
| 686,263 | Conley | Nov. 12, 1901 |
| 2,308,031 | Schmitz | Jan. 12, 1943 |
| 2,542,691 | Mahle | Feb. 20, 1951 |